Nov. 29, 1938.                C. H. EHLERS                 2,138,000
                        INGRESS AND EGRESS VENT VALVE
                            Filed June 9, 1936
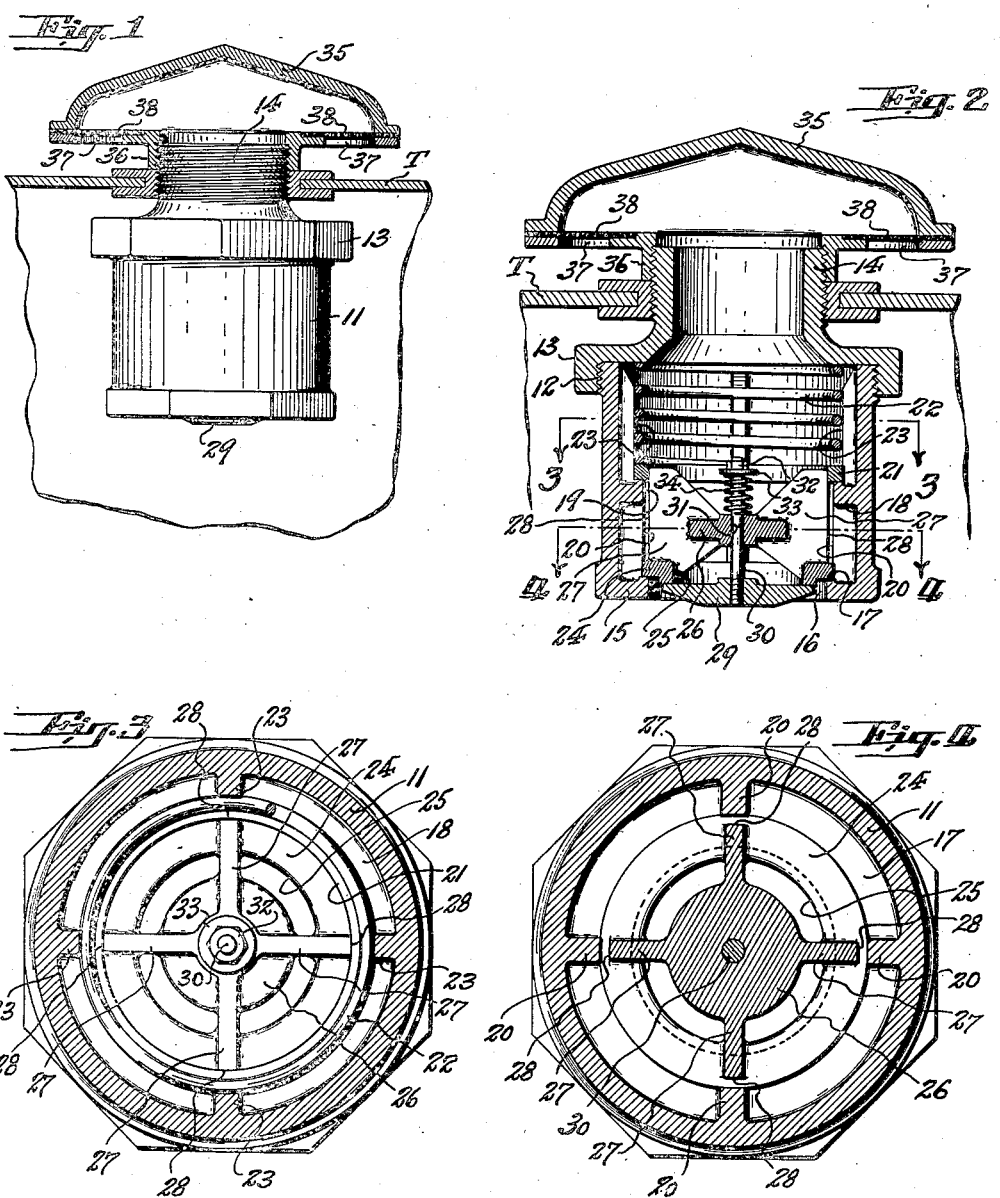
INVENTOR
Carl H. Ehlers,
BY
George D. Richards
ATTORNEY Patented Nov. 29, 1938

2,138,000

UNITED STATES PATENT OFFICE 2,138,000

INGRESS AND EGRESS VENT VALVE

Carl H. Ehlers, Penfield, Pa., assignor to A. W. Wheaton Brass Works, Inc., Newark, N. J., a corporation of New Jersey Application June 9, 1936, Serial No. 84,265

2 Claims. (Cl. 277—45)

This invention relates to an improved vent valve for liquid storage tanks, tank wagons and similar liquid reservoirs, such as used more especially to store or transport volatile liquids, liquid fuels and the like; and the invention has reference, more particularly, to a novel vent valve operative to accommodate both ingress and egress of gases, and also operative, under certain conditions to close against the liquid head of the tank or reservoir content.

This invention has for an object to provide an ingress and egress vent valve of simple construction, adapted for connection with a tank to be served thereby in either interiorly or exteriorly projecting relation thereto; and the invention has for a further object to provide a vent valve operative to compensate or balance pressure within a tank relative to external atmospheric pressure, whether said internal pressure be less than or in excess of external atmospheric pressure. To this end, the novel vent valve comprises a casing open from end to end and having a stationary seat at its inner end upon which an outwardly opening main valve seats by gravity to close said inner end; said main valve carrying a spring closed inwardly opening vacuum relief valve; and said casing being further provided with a yieldable seat engageable by said main valve, should the tank served by the vent valve be overturned, to thereby close said vent valve against escape outflow of liquid from the tank under such conditions; said latter seat being yieldable with said main valve to pressure in excess of liquid head, so as to open the vent valve for the relief of such excess pressure.

Other objects of this invention, not at this time more particularly enumerated, will be understood from the following detailed description of the same.

Illustrative embodiments of this invention are shown in the accompanying drawing, in which:

Fig. 1 is an elevation of the vent valve according to this invention, as applied to a tank (which is shown in section) for interior projection therein to; Fig. 2 is a vertical longitudinal section of the same; Fig. 3 is a horizontal section through the vent valve, taken on line 3—3 in Fig. 2; and Fig. 4 is another horizontal section, taken on line 4—4 in Fig. 2.

Similar characters of reference are employed in the aforesaid views, to indicate corresponding parts.

Referring to the drawing, the reference character 11 indicates the vent valve casing, the same having an externally screw-threaded upper end 12 upon which is engaged a cap 13 having a concentric externally screw-threaded neck 14 of reduced diameter by which the casing is affixed or screwed into the wall T of a tank, so as to depend therefrom into the tank interior. Said casing is provided at its lower end with an internal annular flange 15, which surrounds an opening or port 16; said flange 15 having, at its marginal portion, a valve seat 17. Formed within the interior of casing 11, intermediate its upper and lower end is a second internal flange 18, which surrounds an opening or port 19 of somewhat larger diameter than the lower opening or port 16. Extending between the flanges 15 and 18 are a series of circumferentially spaced guide ribs 20. Normally stopped against downward movement by engagement with the marginal portions of said flange 18 is an upwardly yieldable valve seat ring 21, the same being pressed into normal abutting relation to said flange 18 by a compression spring 22 which is arranged between the same and said cap 13. Extending upwardly from said flange 18 are a series of circumferentially spaced guide ribs 23 by which said yieldable valve seat ring 21 is slidably engaged.

The reference character 24 indicates a main valve member which, by gravity, normally engages the valve seat 17 and thus closes the opening or port 16. Said main valve member 24 is provided with a central opening 25 adapted to serve as an intake port. Axially aligned above said opening or port 16 is a hub portion 26 of reduced diameter. Interconnecting said valve member 24 and said hub portion 26 are a series of radially disposed vertically extending webs 27, the outer vertical margins 28 of said webs slidingly extending into and through the opening of said yieldable valve seat ring 21. Said intake opening or port 25 is normally closed by an inwardly opening valve disc 29, the stem 30 of which extends slidingly through a central guide opening 31 with which said hub portion 26 is provided. Secured by nut 32 upon the extremity of said stem 30 is a stop washer 33, and arranged around said stem, between hub portion 26 and stop washer 33, is a compression spring 34, which operates to yieldably hold said valve disc 29 in closed relation to said opening or port 25.

When the vent valve is applied to the tank so as to extend into the interior thereof, as shown in Figs. 1 and 2, a hood member 35 having a central internally threaded neck 36 is screwed upon the exteriorly projecting end of the vent valve neck 14. Said hood member is provided, at its under annularly extending portion, with openings 37 to communicate with the atmosphere. These openings 37 are preferably guarded by a flame arresting screen 38. The hood member 35, thus provided functions to guard the interior of the vent valve from the weather, operating to effectively prevent the entrance of rain, snow, etc., which, if admitted, might interfere with the proper working of the movable parts of the valve mechanism. The specific form of the hood member 35 as shown is merely illustrative, and is subject to more or less variation in form, structure and attached arrangement, so long as the function of protecting the interior of the vent valve against exposure to the elements is retained.

The novel vent valve according to this invention is subject to the following functional operations in response to the various conditions requiring such operations:—

When liquid is drawn from the tank to which the novel vent valve is connected, and, as a consequence of the displacement of such liquid, a vacuum or partial vacuum tends to develop within the tank interior. In such case, the valve 29 opens inwardly under external atmospheric pressure, thus uncovering the opening or port 25 of main valve 24 so that air from the tank exterior enters the interior thereof. The same result is attained should pressure within the tank be diminished due to cooling and consequent condensation of vapors therein.

When the tank is being filled with liquid, internal air is compressed within the interior thereof above the liquid level. Such air will vent itself through the vent valve. In such case the main valve 24, wherein the opening or port 25 is closed against egress by the valve disc 29, will be lifted against gravity by the pressure of the air, so that the latter will flow outwardly through port 16 and around main valve 24, and thence onwardly to exit through the casing interior and the passages of the hood 35. Pressure of gas due to evaporation of the liquid content of the tank will also relieve itself in the same manner.

The novel vent valve of this invention is especially adapted for use as a vent means for the tanks of tank wagons used for transporting gasolene and similar liquids. A desideratum in a vent valve for such use is an ability to close against outflow or spillage of the gasolene in the event the tank wagon should be overturned. In such case, the vent valve will be turned more or less upside down, and consequently the main valve 24 will move outward, under gravity, to abut the yieldable valve seat ring 21, so as to close against the same, and thus close the valve against liquid outflow. In such case the tension of the spring 22 which controls the valve seat ring 21 is so calculated as to normally resist the normal pressure of liquid head of the tank content. If under these conditions, for any cause, an internal pressure within the tank in excess of the pressure of liquid head occurs, as e. g. by reason of fire, the heat of which effects a rapid evaporation of the tank content, then said spring controlled valve seat ring 21 will yield outwardly, thereby opening the port 19 to escape of fluid. If the tank is upright and abnormal internal pressure occurs for any reason, this same action takes place, so that such abnormal pressure is relieved.

Should the tank while in overturned condition with the vent valve reversed be suddenly cooled, as by a stream of water showered over the same, thereby causing a sudden condensation of gases therein with consequent rapid reduction of internal pressure below the pressure of the outside atmosphere, then main valve 24 will be forced away from the valve seat ring 21 to open the port 19 to ingress of air sufficient to balance the pressures again.

From the above, it will be understood, that the valve in its functioning is well adapted to cope with various conditions of either diminished or increased pressures within the tank. Furthermore, the arrangement is such that relief of fluctuations of moderately increased pressure, due to gases of evaporation, is quickly and easily taken care of by main valve 24 with minimum of loss of such gases, and yet in the event of sudden increase of internal pressure greatly in excess of the moderate pressure due to slow evaporation, such excess pressure is quickly relieved by the yielding of the valve seat ring 21 to assure full opening of port 19 and rapid dissipation of such excess pressure.

It will be obvious that various changes could be made in the vent valve above set forth, and many apparently widely different embodiments of this invention could be made without departing from the scope thereof as defined in the following claims. It is therefore intended that all matter contained in the above description or shown in the accompanying drawing shall be interpreted as illustrative and not in a limiting sense.

I claim:—

1. A vent valve, comprising an endwise open casing having an internal annular valve seat forming flange at its inner end defining a primary port, an egress valve member adapted to seat by gravity on said flange to normally close said primary port, said casing having a second internal flange defining a secondary port opening intermediate the ends of said casing sized to admit movement of said egress valve member therethrough, a spring pressed movable valve seat ring supported by said second flange for outwardly yieldable movement, said valve seat ring overhanging the free margins of said second flange so as to be engageable by said egress valve member whereby the latter under certain conditions may close said secondary port, said egress valve member and valve seat ring, when engaged together, being capable of common outward movement to open said secondary port under other conditions, and said egress valve member having an inwardly opening spring closed ingress valve means connected therewith.

2. A vent valve, comprising an endwise open casing having an internal annular valve seat forming flange at its inner end defining a primary port, an egress valve member adapted to seat by gravity on said flange to normally close said primary port, said casing having a second internal flange defining a secondary port opening intermediate the ends of said casing sized to admit movement of said egress valve member therethrough, a spring pressed movable valve seat ring supported by said second flange for outwardly yieldable movement, said valve seat ring overhanging the free margins of said second flange so as to be engageable by said egress valve member whereby the latter under certain conditions may close said secondary port, said egress valve member having radial guide webs to slidingly engage the inner periphery of said valve seat ring to guide the movements of said valve member relative to said valve seat ring, said egress valve member and valve seat ring, when engaged together, being capable of common outward movement to open said secondary port under other conditions, and said egress valve member having an inwardly opening spring closed ingress valve means connected therewith.

CARL H. EHLERS.